United States Patent [19]
Endo et al.

[11] Patent Number: 4,777,840
[45] Date of Patent: Oct. 18, 1988

[54] STEERING WHEEL

[75] Inventors: Tetsuji Endo, Fujinomiya; Kazuyoshi Nishijima, Shizuoka, both of Japan

[73] Assignee: Nihon Plast Co., Ltd., Shizuoka, Japan

[21] Appl. No.: 933,418

[22] Filed: Nov. 21, 1986

[30] Foreign Application Priority Data

Jan. 14, 1986 [JP] Japan .................................. 61-5975
Mar. 20, 1986 [JP] Japan ................................ 61-63382

[51] Int. Cl.$^4$ ............................ B62D 1/04; G05G 1/10
[52] U.S. Cl. ...................................... 74/552; 29/159 B
[58] Field of Search ................ 74/552, 558; 280/750, 280/777, 778, 731; 29/159 B

[56] References Cited

U.S. PATENT DOCUMENTS

| 4,586,397 | 5/1986 | Kokubu | 74/552 |
| 4,659,244 | 4/1987 | Malvy et al. | 74/552 |
| 4,662,775 | 5/1987 | Faul | 74/552 |

FOREIGN PATENT DOCUMENTS

| 1015704 | 9/1957 | Fed. Rep. of Germany | 74/552 |
| 37228 | 11/1930 | France | 74/552 |
| 1033391 | 7/1953 | France | 74/552 |
| 56-59473 | 10/1981 | Japan | 74/552 |
| 0102657 | 6/1984 | Japan | 74/552 |
| 294034 | 7/1928 | United Kingdom | 74/552 |
| 341185 | 1/1931 | United Kingdom | 74/552 |
| 344168 | 3/1931 | United Kingdom | 74/552 |
| 383072 | 11/1932 | United Kingdom | 74/552 |
| 407818 | 3/1934 | United Kingdom | 74/552 |
| 2058694 | 4/1981 | United Kingdom | 74/552 |

Primary Examiner—Gary L. Smith
Assistant Examiner—Vinh Luong
Attorney, Agent, or Firm—Armstrong, Nikaido, Marmelstein & Kubovcik

[57] ABSTRACT

A steering wheel having a metallic hub formed by upper and lower hub members secured together with a portion of a spoke core held therebetween. The hub members have protrusions and recesses which are press-fitted with the spoke core therebetween and gripped by the two members.

18 Claims, 9 Drawing Sheets

STEERING WHEEL

BACKGROUND OF THE INVENTION

The present invention relates to a steering wheel for a vehicle and, more particularly, to a steering wheel of the type that includes a hub section comprising first and second metallic hub members to be secured to a steering shaft in mutually axiall aligned relationship with each other and a spoke core clamped between the first and second metallic hub members.

Japanese Utility Model Pre-Examination publication No. 59473/81 discloses a steering wheel of the type specified above. The steering wheel disclosed in the Japanese publication includes a pair of metallic annular hub members having mating surfaces shaped to define therebetween channels which receive radially inner ends of spoke cores for connecting the hub members to a rim section of the steering wheel. The metallic hub members are secured together by means of screws to fix the spoke cores to the hub members.

The steering wheel of the prior art, however, has problems that the ends of the spoke cores fixed to hub members tend to be loosened relative to the hub members and that the use of screws to secure the hub members together not only complicates the manufacturing steps due to the necessity for drilling screw holes in the hub members and screwing screws into the thus drilled screw holes but also increases the number of component parts of a steering wheel.

SUMMARY OF THE INVENTION

The present invention aims at providing a steering wheel of the type that is specified above and which is improved to prevent loosening of spoke cores relative to hub members and facilitate simplified assembling steps.

The steering wheel according to the present invention comprises a rim section including a rim core of a metal, a hub section including a metallic hub adapted to be secured to a steering shaft of a vehicle, and at least one spoke core interconnecting the metallic hub to the rim core. The metallic hub comprises a first hub member of a metal defining therein a first through-hole for the steering shaft and a second hub member of a metal defining therein a second through-hole for the steering shaft and disposed in axially aligned relationship to the first hub member. The first and second hub members have opposed surfaces between which a portion of the spoke core is disposed and fixed to the hub members. The first and second hub members are secured together either by press-fitting engagement between the hub members or by welding of the first and second hub members and the portion of the spoke core. The hub members are provided with means for positioning the hub members one to the other.

The features of the present invention pointed out above eliminate the necessity for the use of screws to secure the hub members and spoke core together and, therefore, advantageously reduce the number of component parts of a steering wheel and simplify the steps of manufacture of the steering wheel.

The above and other objects, features and advantages of the present invention will be made more apparent by the following description with reference to the accompanying drawings.

DESCRIPTION OF THE PREFERRED EMBODIMENTS

Figure 1:
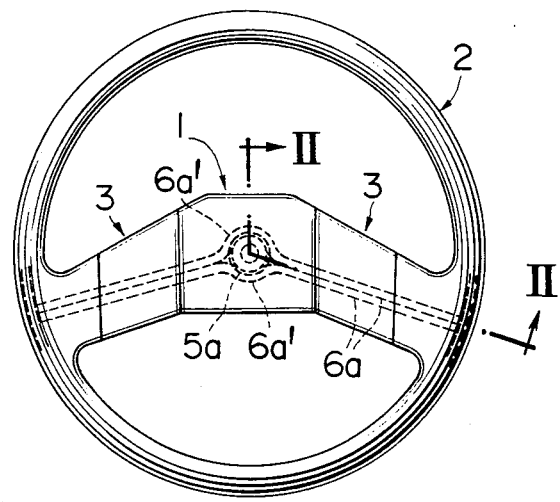
FIG. 1 is a plan view of an embodiment of a steering wheel according to the present invention.
Figure 2:
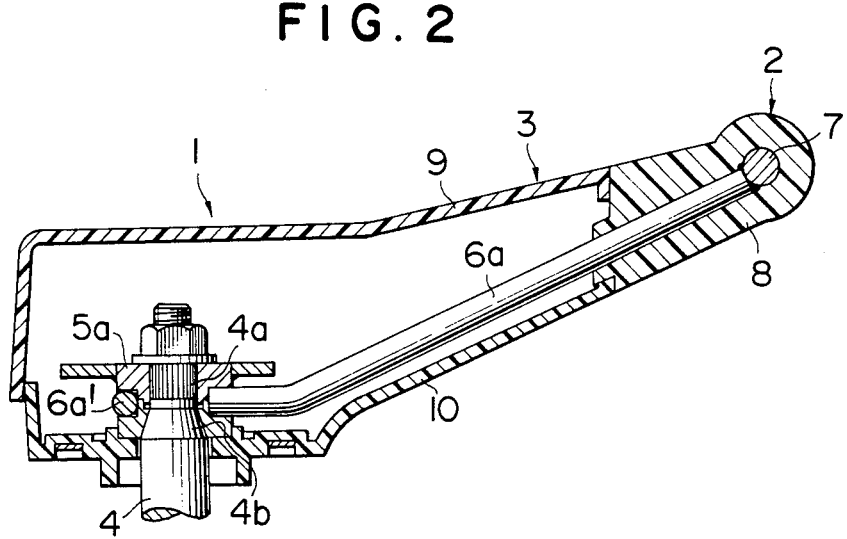
FIG. 2 is an enlarged fragmentary sectional view of the steering wheel taken along line II—II in FIG. 1.

Referring now to FIGS. 1-4B of the drawings, a steering wheel comprises a hub section 1, an annular rim section 2 and a pair of generally radially extending spokes 3 interconnecting the hub section and the rim section. The hub section 1 includes a metallic hub 5a adapted to be secured to a serrated end section 4a of a steering shaft 4 of a vehicle and to a tapered section 4b of the shaft 4. The spokes 3 include a pair of spoke cores 6a formed by lengths of metallic rods having generally arcuate central or intermediate sections which are so shaped as to form a generally circular bends 6a' at which the spoke cores 6 are secured to the outer periphery of the hub 5a. The spoke cores 6a have radially outer ends secured by welding to a rim core 7 of the rim section 2. The rim core 7 is covered with a covering 8 of a soft plastic material. The hub section 1 and the spokes 3 are respectively covered with outer coverings 9 and 10 of a plastic material.

Figure 3:
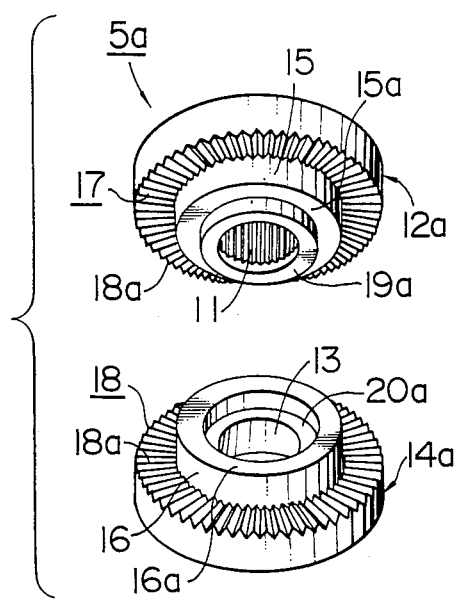
FIG. 3 illustrates hub members in perspective views.
Figure 4A:
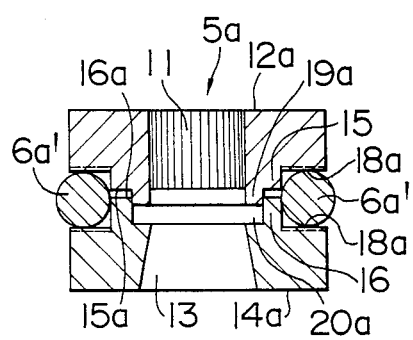
FIGS. 4A and 4B illustrates in sectional views manufacturing steps of assembling hub members and spoke cores together and securing them together.
Figure 4B:
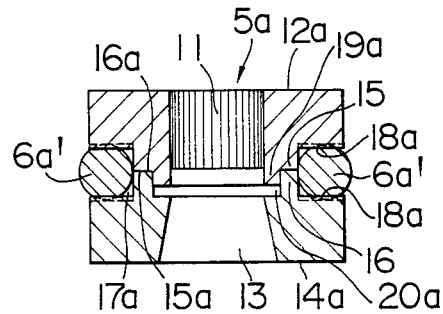

The hub 5a comprises upper and lower hub members 12a and 14a secured together with the central bends of the spoke cores 6a firmly held therebetween, as will be best seen in FIGS. 3-4B. More specifically, the upper hub member 12a is annular and defines therein a serrated central through-hole 11 adapted to be engaged with the serrated end section 4a of the steering shaft 4. The lower hub member 14a is also annular and defines therein a tapered central through-hole 13 adapted to be engaged with the tapered section 4b of the steering shaft 4.

The lower end face of the upper hub member 12a directed to the lower hub member 14a is formed thereon with an annular engagement protrusion 15 extending around the serrated central through-hole 11 and having an outer diameter dimensioned to cause the engagement protrusion 15 to be contacted by the inner sides of the central bends 6a' of the spoke cores 6a. The upper surface of the lower hub member 14a directed to the upper hub member 12a is formed thereon with a similar annular engagement protrusion 16 extending around the tapered central through-hole 13 and having an outer diameter dimensioned to be contacted by the inner sides of the central bends 6a' of the spoke cores 6a. The annular engagement protrusions 15 and 16 project axially from the lower and upper surfaces of the upper and lower hub members 12a and 14a, respectively, and have annular end faces 15a and 16a in abutment engagement with each other, as best seen in FIG. 4B, so that a circumferential groove 17a is defined between the opposed surfaces 17 and 19 of the upper and lower hub members around the abutting annular engagement protrusions 15 and 16. The opposed upper and lower surfaces 17 and 18 of the circumferential groove 17a cooperate to grip therebetween the spoke cores 6a. For this purpose, these surfaces 17 and 18 are respectively provided with annular rows of radial serrations 18a which bite the round metallic rods of the spoke cores 6a to firmly hold them against movement relative to the hub members 12a and 14a. For this purpose, the upper and lower hub members 12a and 14a are made of a metallic material which is harder than the metallic material of the spoke cores 6a.

The upper hub member 12a is further provided with an annular projection 19a disposed between the annular engagement protrusion 15 and the central through-hole 11 and axially extending beyond the annular end face of the protrusion 15. The lower hub member 14a is provided with an annular recess 20a disposed between the central through-hole 13 and the annular engagement protrusion 16. The annular projection 19a and the annular recess 20a are dimensioned such that the projection 19a can be press-fitted into the recess 20a with the central bends 6a' of the spoke cores 6a held between the serrated gripping faces 17 and 18 of the upper and lower hub members 12a and 14a, as shown in FIG. 4A.

When the upper and lower hub members 12a and 4a and the spoke cores 6a are assembled, these members are relatively placed in a manner shown in FIG. 4A and the upper and lower hub members 12a and 14a are forced toward each other with a pressing force of about 1-2 tons to press-fit the annular projection 19a into the annular recess 20a until the end faces 15a and 16a of the engagement protrusions 15 and 16 of the upper and lower hub members 12a and 14a are brought into abutment engagement with each other. When this position is reached, the radial serrations 18a on the gripping faces 17 and 18 of the groove 17a firmly bite the central bends 6a' of the spoke cores 6a to rigidly secure the spoke cores 6a to the upper and lower hub members 12a and 14a, as shown in FIG. 4B.

This embodiment of the invention is advantageous in that, because the serrations 18a on the gripping faces 17 and 18 of the circumferential groove 17a are substantially perpendicular to the axis of the arcuate central bends 6a' of the spoke cores 6a, the gripping faces of the groove 17a are effective to hold the spoke cores 6a against rotation about the axis of the hub 5a. In addition, because the arcuate bends 6a' of the two spoke cores 6a are disposed on the diametrically opposite sides of the outer periphery of the hub 5a, the spoke cores 6a are prevented from being dislodged from the hub 5a radially outwardly thereof.

In the described and illustrated embodiment of the invention, the spoke cores 6a are made of rods of a metal of a mechanical strength sufficient to withstand a load applied to the steering wheel. A preferred example of the metallic material of the spoke cores 6a is a steel having a Brinell hardness of from 80 to 100 under JIS (Japanese Industrial Standard). The upper and lower hub members 12a and 14a of the hub 5a are made of a metal harder than the metallic material of the spoke cores 6a. A preferred metallic material of the hub members 12a and 14a is a steel of a hardness higher than Brinell hardness of 120 under JIS. The height or axial dimension of each of the serrations 18a on the gripping surfaces 17 and 18 of the upper and lower hub members 12a and 14a may be from 0.3 to 1.0 mm and preferably 0.5 mm, while the diameter of the metallic rod from which the spoke cores 6a are prepared may have a diameter of from 9 to 10 mm.

Figure 5:
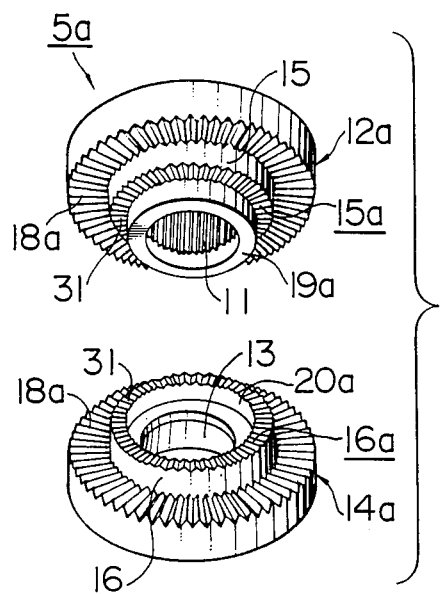
FIG. 5 is similar to FIG. 3 but illustrates a first modification to the hub members shown in FIGS. 1-4.
Figure 6A:
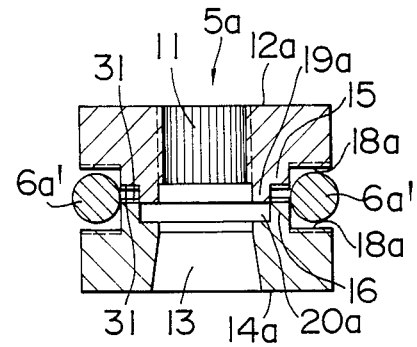
FIGS. 6A and 6B are similar to FIGS. 4A and 4B but illustrate steps of assembling the modified hub members and spoke cores together and securing them together.
Figure 6B:
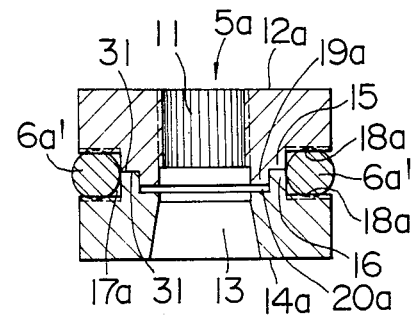

In a modification shown in FIGS. 5-6B, the annular end faces 15a and 16a of the annular engagement protrusions 15 and 16 are respectively formed thereon with annular rows of radial serrations 31 which, when the upper and lower hub members 12a and 14a are forced toward each other from a position shown in FIG. 6A to a position shown in FIG. 6B to press-fit the annular projection 19a of the upper hub member 12a into the annular recess 20a in the lower hub member 14a, are brought into meshing engagement with each other to lock the upper and lower hub members 12a and 14a against relative rotation.

Figure 7:
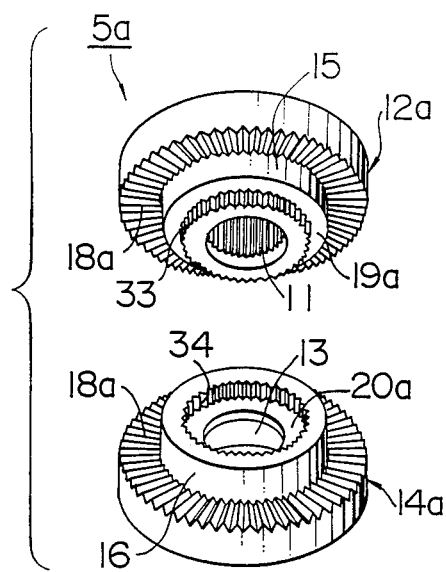
FIG. 7 is similar to FIGS. 3 and 5 but illustrates further modified hub members.
Figure 8A:
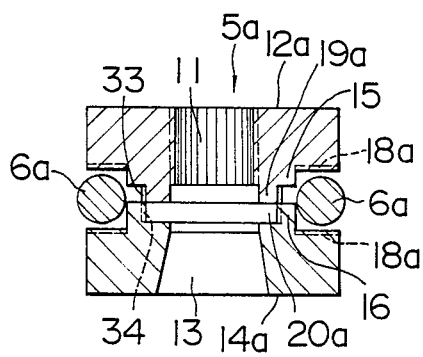
FIGS. 8A and 8B are similar to FIGS. 6A and 6B but illustrate step of assembling the further modified hub members and spoke cores together and securing them together.
Figure 8B:
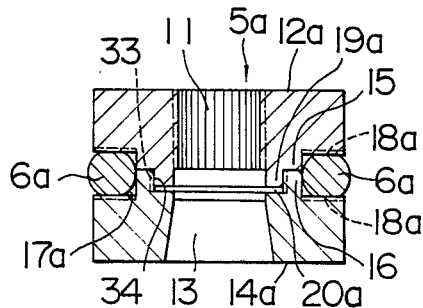

In a further modification shown in FIGS. 7-8B, the outer peripheral surface of the annular projection 19a of the upper hub member 12a is formed thereon with an annular row of axial serrations 33, while the inner prepheral surface of the annular recess 20a is formed thereon with an annular row of axial serrations 34 adapted to be in meshing engagement with the serrations 33 on the annular projection 19a of the upper hub member 12a when the upper and lower hub members 12a and 14a are forced toward each other from a position shown in FIG. 8A to a position shown in FIG. 8B. Thus, the axial serrations 33 and 34 are also effective to lock the upper and lower hub members 12a and 14a against relative rotation.

Figure 9:
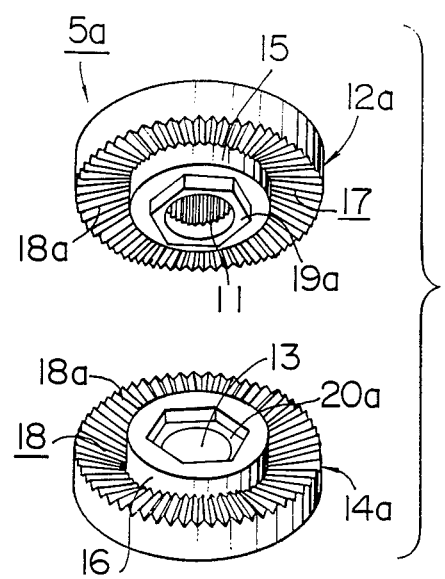
FIG. 9 is similar to FIG. 7 but illustrates still further modified hub members.
Figure 10A:
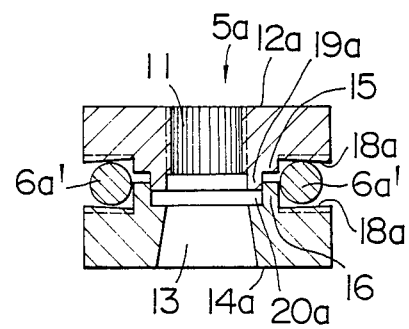
FIGS. 10A and 10B are similar to FIGS. 8A and 8B but illustrate steps of assembling the still further modified hub members and spoke cores and securing them together.
Figure 10B:
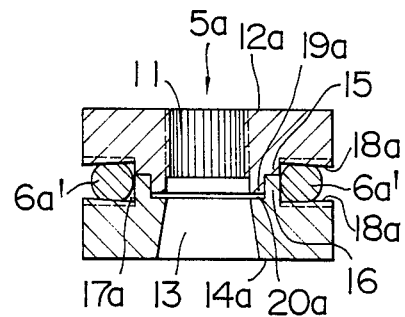

In a still further modification shown in FIGS. 9–10B, the projection 19a and the recess 20a are not annular but of complementary polygons so that the projection 19a can be press-fitted into the recess 20a to lock the upper and lower hub members 12a and 14a against relative rotation. In addition, the heights of the radial serrations 18a on the gripping surfaces 17 and 18 are increased radially outwardly so that the gripping surfaces 17 and 18 can more reliably grip the spoke cores 6a against radially outward removal from the hub 5a.

Figure 11:
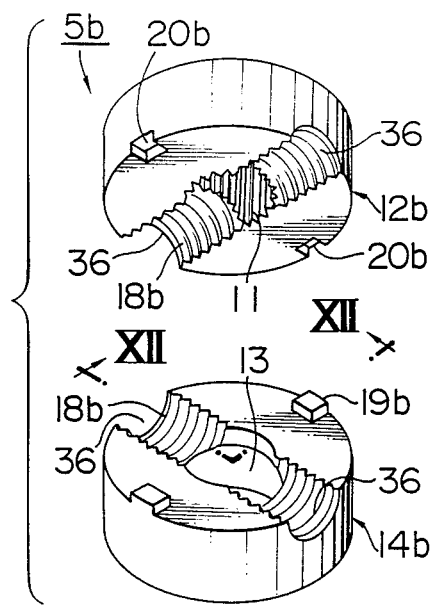
FIG. 11 is similar to FIG. 9 but illustrates hub members of another embodiment of the invention.
Figure 12A:
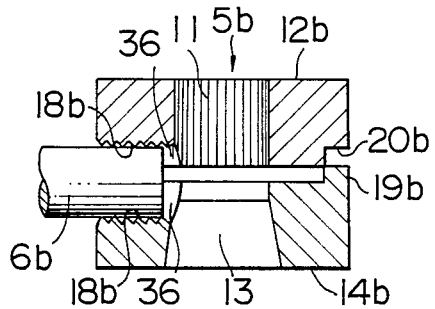
FIGS. 12A and 12B are sections taken along line XII—XII in FIG. 11 and illustrate steps of assembling the hub members shown in FIG. 11 and a spoke core together and securing them together.
Figure 12B:
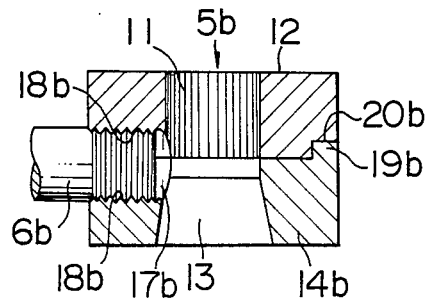

FIGS. 11–12B show another embodiment of the invention in which a pair of spoke cores, only one of which is shown at 6b, have their radially inner ends secured to a hub 5b which comprises a pair of upper and lower hub members 12b and 14b. The upper hub member 12b is formed therein with a serrated central through-hole 11, as in the preceding embodiment of the invention. The lower hub member 14b is also formed therein with a tapered through-hole 13, also as in the preceding embodiment. The distinction of the embodiment shown in FIGS. 11–12B is that the bottom surface of the upper hub member 12b and the upper surface of the lower hub member 14b are formed therein with diametrically extending grooves 36 each having a substantially semi-circular cross-section so that, when the upper and lower hub members 12b and 14b are assembled and secured together as shown in FIG. 12B, the grooves 36 in the upper hub member 12b cooperate with the grooves 36 in the lower hub member 14b to define a pair of radially extending channels 17b in which the radially inner ends of spoke cores 6b are received. The inner peripheral surfaces of the radial hole 17b are formed thereon with serrations 18b extending circumferentially of the axes of the radial holes 17b so that the channels 17b can firmly grip the radially inner ends of the spoke cores 6b. For this purpose, the hub members 12b and 14b are made of a material harder than the material of the spoke cores 6b, as in the preceding embodiment of the invention. The upper hub member 12b is further provided with a pair of generally square recesses 20b formed on the bottom surface of the upper hub member 12b and spaced at circumferentialy substantialy equal intervals relative to the grooves 36. The upper surface of the lower hub member 14b is formed thereon with a pair of generally square projections 19b which are disposed and dimensioned such that, when the upper and lower hub members 12b and 14b are forced toward each other from a position shown in FIG. 12A to a position shown in FIG. 12B, the projections 19b are press-fitted into the recesses 20b to rigidly secure the two hub members and the spoke cores together so that the serrations 18b on the inner peripheral surfaces of the radial holes 17b bite the radially inner ends of the spoke cores 6b to firmly grip them again radially outward removal from the holes 17b.

Figure 13:
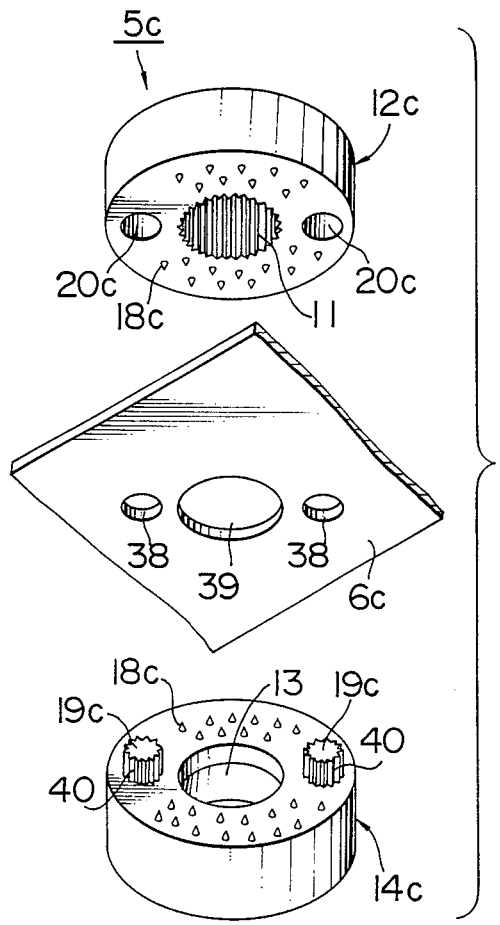
FIG. 13 illustrates in perspective views hub members and a modified spoke core of a further embodiment of the invention.
Figure 14:
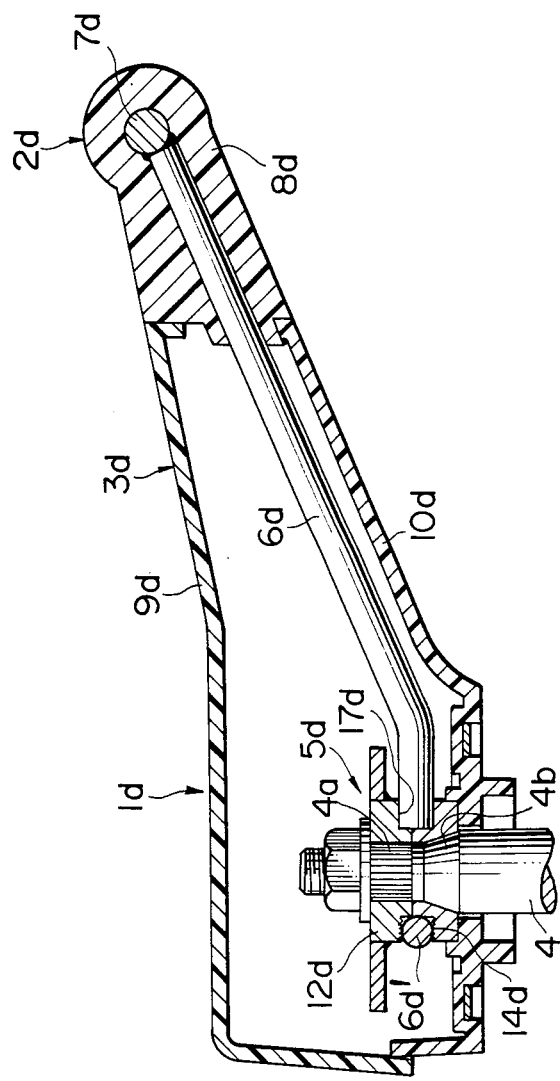
FIG. 14 is similar to FIG. 2 but illustrates a still further embodiment of the present invention.
Figure 15:
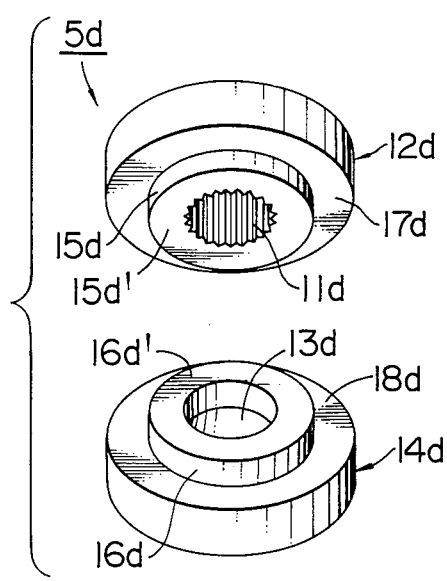
FIG. 15 illustrates in perspective views pair of hub members employed in the embodiment shown in FIG. 14.

FIG. 13 shows a further embodiment of the invention which is distinguished from the preceding embodiments in that this embodiment employs a spoke core 6c formed of a web of a metal and designed not to be covered with any decorative covering. In other words, the outer surfaces of the spoke core 6c are exposed when in use. The spoke core 6c is pinched between upper and lower hub members 12c and 14c which form a hub 5c. The bottom surface of the upper hub member 12c is formed therein with a serrated central through-hole 11, as in the preceding embodiments of the invention and, in addition, with a pair of substantially circular recesses 20c disposed in diametrically opposed relationship with each other. The upper surface of the lower hub member 14c is formed thereon with a pair of projections 19c disposed in diametrically opposed relationship with each other and on the opposite sides of a tapered through-hole 13 formed in the lower hub member 14c, as in the preceding embodiments of the invention. The projections 19c have peripheral surfaces formed with axial serrations 40. The spoke core 6c is formed therein with a central hole 39 for a steering shaft, not shown in FIG. 13, and with a pair of smaller holes 38 disposed on the opposite sides of the steering shaft hole 39. The recesses 20c in the upper hub member 12c, the projections 19c on the lower hub member 14c and the smaller holes 38 in the spoke core 6c are so dimensioned and positioned that, when the upper and lower hub members 12c and 14c are forced toward each other as in the preceding embodiments with the spoke core 6c placed between the upper and lower hub members 12c and 14c, the projections 19c extend through the smaller holes 38 in the spoke core 6c and are press-fitted into the recesses 20c to secure the three members together. In order to further securely fix the spoke core 6c to the upper and lower hub members 12c and 14c, the hub members are formed thereon with small pointed projections 18c which bite the spoke core 6c. For this purpose, the hub members 12c and 14c are formed from a material harder than the material from which the spoke core 6c is formed.

A still further embodiment of the steering wheel of the present invention is shown in FIGS. 14–16B in which parts similar to those of the embodiment shown in FIGS. 1–4B are designated by similar reference numerals followed by "d" to save repeated descriptions of similar parts of the steering wheel. The difference only will be described hereunder.

The most important difference of the embodiment shown in FIGS. 14–16B from the preceding embodiments is that a central arcuate potion 6d' of a spoke core 6d is secured to upper and lower hub members 12d and 14d of a hub 5d by welding. Compared with the embodiments shown in FIGS. 1–13, therefore, the hub members 12d and 14d are not provided with any projections and recesses to be press-fitted together to secure the upper and lower hub members.

Figure 16A:
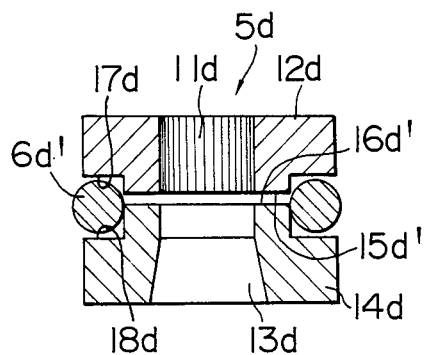
FIGS. 16A and 16B illustrate steps of assembling the hub members shown in FIG. 15 and spoke cores together and securing them together.
Figure 16B:
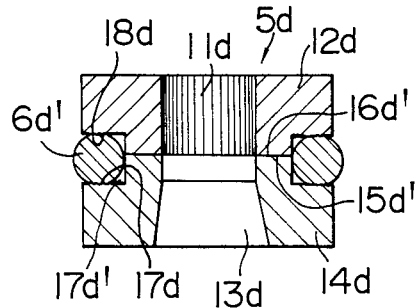

More specifically, the upper and lower hub member 12d and 14d have annular engagement protrusions 5d and 16d having annular end faces 15d' and 16d' to be disposed in abutment engagement with each other, as shown in FIG. 16B, so that an annular circumferential groove 17d' is defined between the upper and lower hub members 12d and 14d. The heights of the annular protrusions 15d and 16d are determined such that the width of the circumferential groove 17d', as measured in the axial direction of the hub 5d, is slightly smaller than the diameter of a metallic rod of the spoke core 6d. As an example, the spoke core 6d may be prepared from a metallic rod having diameter of from 9 to 10 mm which is greater, by from 0.3 to 1.0 mm, than the width or axial dimension of the circumferential groove 17d'.

When the upper and lower hub members 12d and 14d and the spoke core 6d are secured together, these members are first placed relative to each other in a manner shown in FIG. 16A; Namely, the hub members 12d and 14d are placed with the annular protrusions 15d and 16d axially aligned and being in contact with an inner side of a central arcuate bend 6d' of the spoke core 6d. Then, electrodes of a resistance welding machine (not shown) are applied to the upper and lower hub members 12d and 14d and are moved toward each other to force the hub members toward each other while an electric voltage is applied across the electrodes. Because the spoke core 6d is in electrical contact with the upper and lower hub member 12d and 14d, a welding current passes through the contacting portions of the upper and lower hub members and the spoke core so that these portions are fused. The pressure applied to the upper and lower hub members by the welding electrodes continues to move these members toward each other until the annular end surfaces 15d' and 16d' of the annular protrusions 15d and 16d are brought into abutment engagement with each other, as shown in FIG. 16B, whereby welding is completed.

During the welding operation, the stroke of the welding electrodes is not fixed but kept freely adjustable to assure that the pressure applied to the upper and lower hub members is adjustable. In addition, the welding current is adjusted during the welding. However, it will be appreciated that, because the spoke core 6d is in electrically conductive contact with the upper and lower hub members 12d and 14d over a very limited areas in the initial stage of the welding, the electrical resistance at these contacting areas is relatively high to insure that the contacting portions of the hub members and the spoke core are heated and fused while the hub members are continuously urged toward each other. Thus, the fused portions of the hub members and the spoke core are deformed to increase the areas of contact between these members with a resultant decrease in the electrical resistance at these contacting areas and thus decrease in the generation of heat at the contacting portions of the hub members and the spoke core until the annular end surfaces 15d' and 16d' of the annular engagement protrusions 15d and 16d of the upper and lower hub members 12d and 14d abut each other to mechanically stop the movement of the hub members toward each other. In other words, the annular end surfaces 15d' and 16d' of the annular engagement protrusions 15d and 16d act as stops to properly position the upper and lower hub members when the welding is to be stopped.

As will be seen from the foregoing description, when the welding operation is conducted, the upper and lower hub members 12d and 14d are positioned in alignment with each other by the contact of the annular engagement protrusions 15d and 16d with the arcuate central bend 6d' of the spoke core 6d. In addition, the abutment engagement between the annular end surfaces 15d' and 16d' of the annular protrusions 15d and 16d assures that the hub 5d formed by the welded hub members 12d and 14d has a precisely controlled axial dimension regardless of whether the welding electrodes are new or not. Thus, the welding electrodes can be used all over their operative lives. In addition, the upper and lower hub members 12d and 14d can easily be prepared because the annular abutment protrusions 15d and 16d can easily be formed by machining one end face of each of the hub members.

Figure 17:
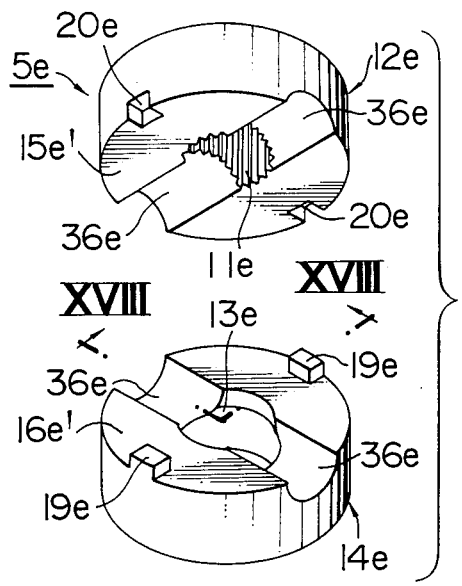
FIG. 17 is similar to FIG. 15 but illustrates hub members employed in a still further embodiment of the invention.
Figure 18A:
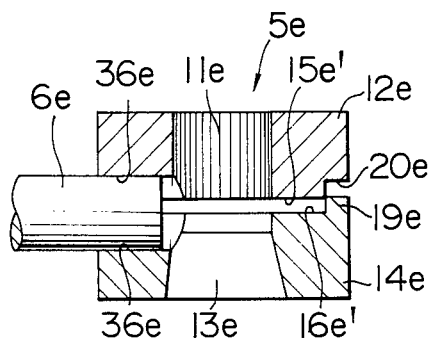
FIGS. 18A and 18B are sections taken along line XVIII—XVIII in FIG. 17 and illustrate the steps of assembling the hub members shown in FIG. 17 and a spoke core together and securing them together.
Figure 18B:
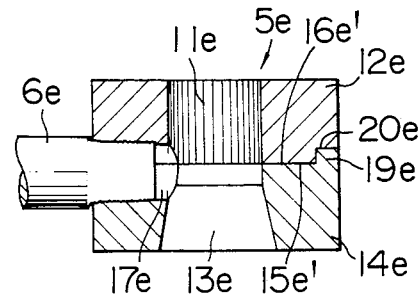

FIGS. 17–18B show modified hub members 12e and 14e of a still further embodiment of the invention similar in structure to the embodiment described with reference to FIGS. 11–12B. Thus, the parts of the embodiment similar to those shown in FIGS. 11–12B are designated by similar reference numerals followed by "e". The difference of the embodiment shown in FIGS. 17–18B is that the hub members and spoke cores (only one of which is shown at 6e) are secured together by welding, as in the embodiment shown in FIGS. 15–16B. More specifically, axially opposed end surfaces 15e' and 16e' of the hub members 12e and 14e are formed therein with radial grooves 36e which, when the hub members are assembled and welded together as shown in FIG. 18B, cooperate to define radially extending channels 17e having substantially circular cross-sections and substantially smooth inner peripheral surfaces. The inner diameter of each hole 17e, however, is slightly smaller than the diameter of a metallic rod from which the spoke cores 6e are prepared. The opposed surfaces 15e' and 16e' of the upper and lower hub members 12e and 14e are provided with pairs of substantially square recesses 20e and projections 19e to be engaged with each other when the upper and lower hub members are assembled to precisely position the two hub members in the circumferential direction thereof.

When the upper and lower hub members 12e and 14e and the spoke cores 6e are welded, these members are placed relative to each other in a manner shown in FIG. 18A. Then, welding electrodes of a resistance welding machine (not shown) are applied to the hub members to conduct a resistance welding in such a manner as discussed in connection with the embodiment shown in FIGS. 14–16B until the upper and lower sides of the radially inner ends of the spoke cores 6e are welded to the inner surfaces of the radial grooves 36e. It will be noted that, because the upper and lower hub members 12e and 14e are urged toward each other by the welding electrodes, the axially opposed end surfaces 15e' and 16e' of the upper and lower hub members 12e and 14e are ultimately brought into abutment engagement with each other when the spoke cores 6e and the hub members 12e and 14e are welded together. Thus, the abutment engagement between the end surfaces 15e' and 16e' are effective to assure that a hub 5e formed by the two hub members thus welded has a precisely controlled axial dimension.

Figure 19:
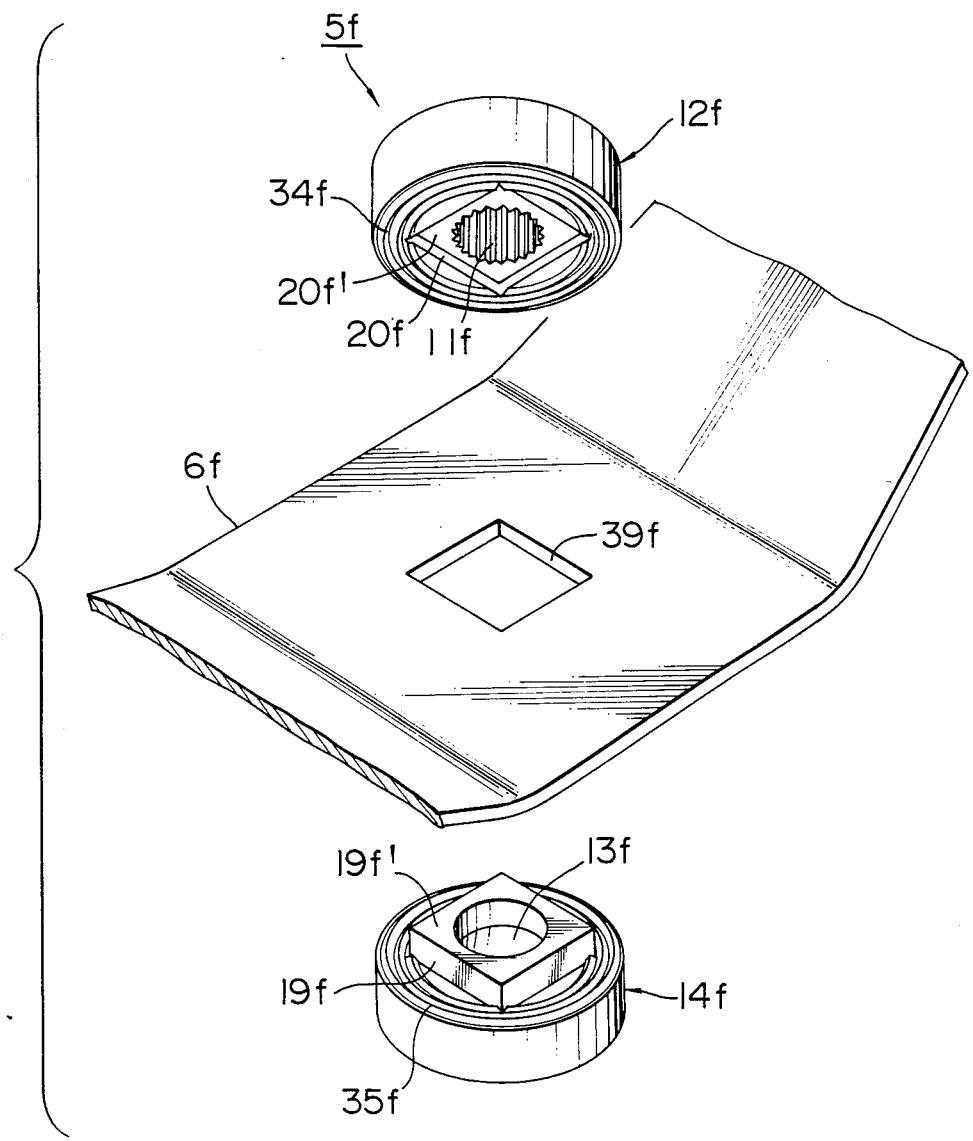
FIG. 19 illustrates in perspective views hub members and a spoke core of a still further embodiment of the invention.
Figure 20A:
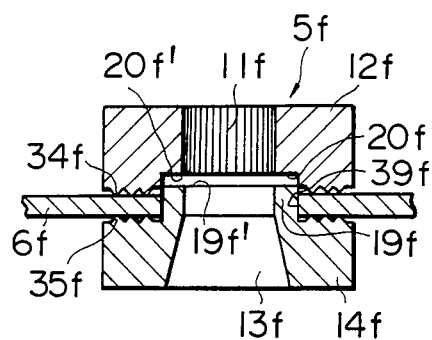
FIGS. 20A and 20B illustrate steps of assembling the hub members and spoke core shown in FIG. 19 and securing them together.
Figure 20B:
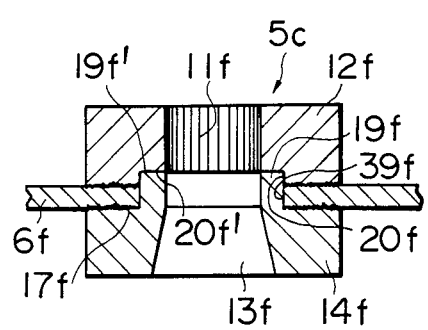

A still further embodiment shown in FIGS. 19–20B is somewhat similar in structure to the embodiment described with reference to FIG. 13 in that a hub 5f is connected with a spoke core 6f which is formed of a web of a metal and is designed not to be covered with any decorative covering; namely, the spoke core 6f has its outer surfaces to be exposed when in use. However, the spoke core 6f is secured to the hub 5f by welding. More specifically, the hub 5f comprises upper and lower hub members 12f and 14f, as in the preceding embodiments. The upper and lower hub members 12f and 14f are formed therein with a serrated central through-hole 11f and a tapered central through-hole 13f, respectively, for the purpose already made apparent. The bottom end surface of the upper hub member 12f is formed with a substantially square engagement recess 20f disposed coaxially with the central through-hole 11f and having a bottom face 20f'. This recess 20f is surrounded by a plurality of concentric circumferential projections or ridges 34f formed on the bottom surface of the upper hub member 12f. The upper end surface of the lower hub member 14f is formed thereon with a substantially square engagement protrusion 19f disposed coaxially with the central through-hole 13f and having a top face 19f'. The protrusion 19f is designed to be press-fitted into the square recess 20f in the upper hub member 12f and is also surrounded by a plurality of circumferential projections or ridges 35f formed on the upper surface of the lower hub member 14f. The spoke core 6f is formed therein with a substantially square central hole 39f of a size which allows the square protrusion 19f to extend therethrough.

The square engagement recess 20f and protrusion 19f are dimensioned such that, when the protrusion 19f is press-fitted into the recess 20f until the top face 19f' of the protrusion 19f is contacted by the bottom face 20f' of the recess 10f, as shown in FIG. 20B, an annular space 17f is defined between the bottom surface of the upper hub member 12f and the upper surface of the lower hub member 14f. As an example, the width or axial dimension of the annular space 17f is smaller, by from 0.3 to 1.0 mm, than the thickness of the spoke core 6f which preferably is 4 mm.

When the spoke core 6f is secured to the upper and lower hub members 12f and 14f, the three members are assembled in a manner shown in FIG. 20A; namely, the upper and lower hub members are assembled so that the spoke core 6f is disposed between the two hub members and the engagement protrusion 19f extends through the central hole 39f in the spoke core 6f. Then, a pair of welding electrodes of a resistance welding machine (not shown) are applied to the upper and lower hub members 12f and 14f and are moved toward each other to urge the hub members toward each other while a welding voltage is applied across the welding electrodes, as in the welding operation already described above. Thus, a welding current flows through the circumferential ridges 34f of the upper hub member 12f and the upper surface of the spoke core 6f and through the lower surface of the spoke core and the circumferential ridges of the lower hub member 14f so that these portions are fused. The upper and lower hub members 12f and 14f are urged toward each other until the top face 19f' of the engagement protrusion 19f is engaged by the bottom face 20f' of the engagement recess 20f as shown in FIG. 20B. When this position is reached, the welding operation is completed. It is again noted that the abutment engagement between the top surface 19f' of the engagement protrusion 19f and the bottom face 20f' of the recess 20f is effective to assure that the hub 5f formed by the thus welded upper and lower hub members 12f and 14f can be given a precisely controlled axial dimension.

Figure 21:
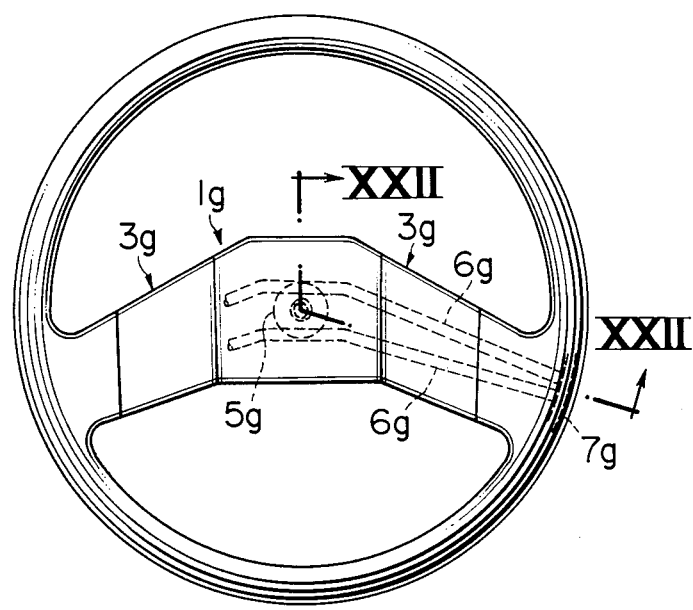
FIG. 21 is a plan view of a still further embodiment of the steering wheel according to the present invention.
Figure 23:
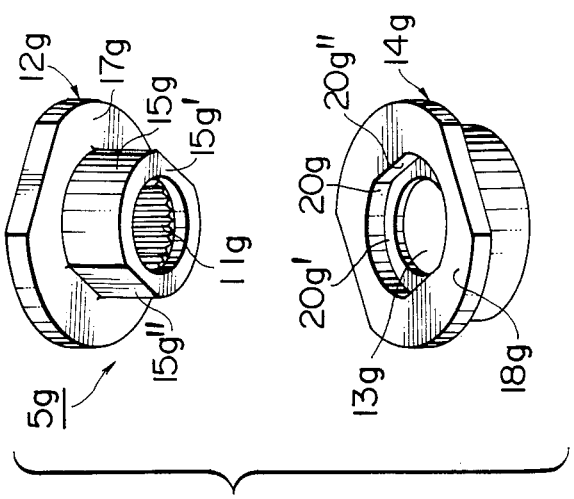
FIG. 23 illustrates in perspective views hub members of the embodiment shown in FIGS. 21 and 22.
Figure 22:
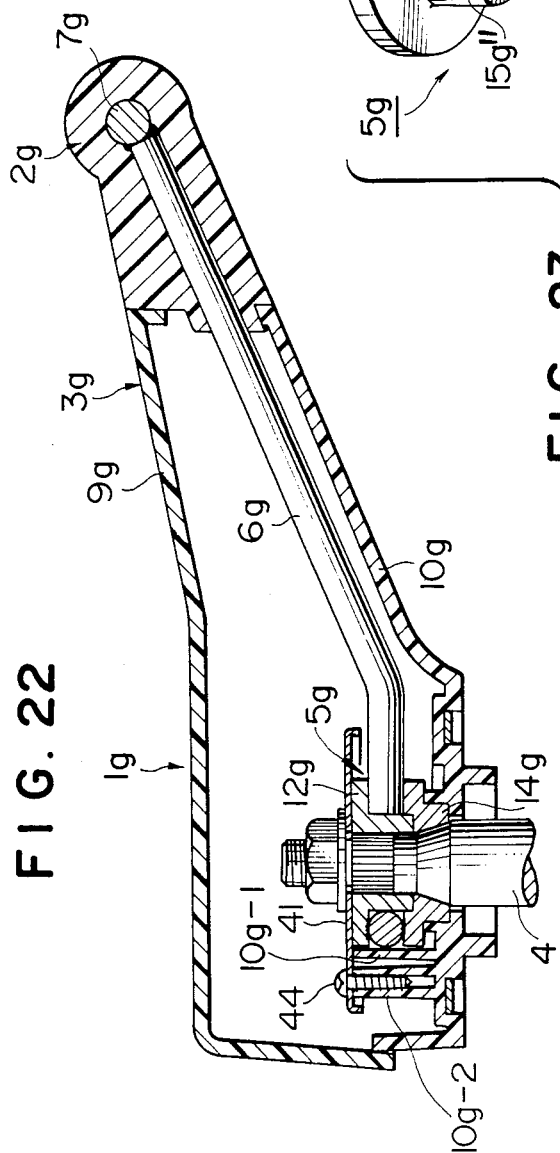
FIG. 22 is an enlarged fragmentary sectional view of the steering wheel shown in FIG. 21 taken along line XXII—XXII in FIG. 21.

A still further embodiment of the steering wheel according to the present invention is shown in FIGS. 21-23 wherein the parts of the embodiment similar to those of the first embodiment shown in FIGS. 1-4B are designated by similar reference numerals followed by "g". The steering wheel of this embodiment includes a pair of spoke cores 6g formed by metallic rods each having opposite radially outer ends welded to a rim core 7g and a substantially straight intermediate or central portion secured to a hub 5g which is composed of a pair of hub members 12g and 14g best shown in FIG. 23. More specifically, the upper hub member 12g has a bottom end surface 17g formed thereon with an axial protrusion 15g through which a cerrated central through-hole 11g for a steering shaft 4 extends. The outer peripheral surface of the axial protrusion 15g is substantialy cylindrical excepting flat surface portions 15g''. The protrusion 15g has a generally oval end face 15g'. The lower hub member 14g has an upper end 18g in which an engagement recess 20g is formed to receive the engagement protrusion 15g on the upper hub member 12g. For this purpose, the recess 20g is dimensioned and shaped such that the protrusion 15 can be press-fitted into the recess 20g so that the press-fitted engagement between the protrusion 15g and the recess 20g holds the two hub members against axial dislodgement and against rotation. The recess 20g has a bottom face 20g' in which a tapered through-hole 13g for the steering shaft 4 is open. The axial dimension of the protrusion 15g and the depth of the recess 20g are determined such that, when the protrusion 15g is inserted into the recess 20g until the end face 15g' of the protrusion 15g is engaged with the bottom face 20g' of the recess 20g, the bottom face 17g of the upper hub member 12g and the upper face 18g of the lower hub member 14g define therebetween an annular space of an axial dimension slightly smaller than the diameter of the metallic rod from which the spoke cores 6g are prepared. The upper and lower hub members 12g and 14g and the spoke cores 6g are welded together as in the preceding embodiments so that these members are secured together, as shown in FIG. 22.

Referring to FIG. 22, the lower hub member 14g has a lower portion which is surrounded by a lower cover 10g of a molded plastic material. The lower cover 10g includes a pair of axial projections only one of which is designated by 10g-1. Each projection 10g-1 is so disposed as to engage the radially outer side of the central part of one of the spoke cores 6g to prevent the spoke core 6g from being disconnected from the hub 5g even if the welded portions were broken. The lower cover 10g further includes a second set of four axial projections only one of which is designated by 10g-2. A mounting member 41 formed from a metallic plate is secured to the top surface of the upper end face of the hub 5g and extends radially outwardly therefrom. Each of the second set of projections 10g-2 has an upper free end secured to the mounting plate 41 by a screw 44 so that the lower cover 10g is fixed to the hub 5g.

In the embodiments described with reference to FIGS. 14-23, the upper and lower hub members may be formed from either the same metallic material or different metallic materials. For example, the upper hub members may be formed from mild steel or stainless steel, while the lower hub members may be formed from a hard steel to facilitate easy removal of the lower hub members from associated tapered portions of steering shaft.

Moreover, the upper hub members may alternatively be formed therein with tapered through-holes, while the lower hub members may alternatively be formed therein with serrated through-holes.

What is claimed is:

1. A steering wheel for a vehicle comprising: a rim section including a rim core of metal, a hub section including a metallic hub for securing said steering wheel to a steering shaft of the vehicle, and at least one spoke core interconnecting said metallic hub and said rim core, said metallic hub comprising a first hub member of a metal defining therein a first through-hole for said steering shaft and a second hub member of a metal defining therein a second through-hole for said steering shaft and disposed in axially aligned relationship to said first hub member, said first and second hub members having opposed surfaces, said spoke core having a portion disposed between and fixed to said opposed surfaces of said hub member for securing together said first and second hub members and said portion of said spoke core, said hub members have means for positioning said hub members one to the other, one of said first and second hub members having at least one recess and the other of said hub members having a protrusion press-fitted in said recess for securing said hub members together, and wherein said hub members are formed from a metal harder than the metal of said spoke core and said opposed surfaces of said hub members are respectively formed thereon with first and second groups of gripping projections engaged with said portion of said spoke core.

2. A steering wheel according to claim 1, wherein said gripping projections on said opposed surfaces of said hub members are serrations each extending substantially perpendicularly to an axis of said portion of said spoke core.

3. A steering wheel according to claim 1, wherein said recess and said protrusion are both substantially annular and disposed around said first and said second through-holes in said hub members, respectively.

4. A steering wheel according to claim 3, wherein said hub members are further provided with third and fourth groups of projections formed on said opposed surfaces, said third and fourth groups of projections being disposed around said annular recess and protrusion, respectively, the projections of said third group being in engagement with the projections of said fourth group to lock said hub members against rotation.

5. A steering wheel according to claim 1, wherein said recess and said protrusion are both polygonal and are in press-fitted engagement with each other to secure said hub members together against removal in the axial direction of said hub and against relative rotation.

6. A steering wheel according to claim 1, wherein said opposed surfaces of said hub members define therebetween a circumferential space in which said portion of said spoke core is disposed, and wherein said circumferential space has an axial dimension which is smaller in a radially outer peripheral zone of said circumferential space than in a radially inner peripheral zone of said circumferential space whereby said portion of said spoke core is held in said circumferential space against removal in a radially outward direction of said hub.

7. A steering wheel according to claim 1, wherein said opposed surfaces of said hub members are provided by radial grooves formed in said hub members, said grooves being aligned axially of said hub to cooperate to define a radial channel in which said portion of said spoke core is received and fixed against removal in the radial direction of said hub.

8. A steering wheel according to claim 1, wherein said opposed surfaces of said hub members are formed by end surfaces of said hub members and said spoke core is formed of a web of a metal formed therein with a central hole for said steering shaft and another hole through which said protrusion extends into said recess.

9. A steering wheel according to claim 8, wherein said gripping projections of said first and second groups are pointed projections extending from said opposed end faces of said hub members into gripping engagement with said spoke core.

10. A steering wheel according to claim 4, wherein said recess and said protrusion have peripheral surfaces in engagement with each other and wherein said third and fourth groups of projections are formed on said peripheral surfaces of said recess and protrusion and are in locking engagement with each other.

11. A steering wheel according to claim 1, wherein said steering shaft includes a serrated section and a tapered section, and wherein said first through-hole in said first hub member has a serrated inner peripheral surface for engagement with said serrated section of said steering shaft and said second through-hole in said second hub member has a tapered inner peripheral surface for engagement with said tapered section of said steering shaft.

12. A steering wheel according to claim 1, wherein said portion of said spoke core is welded to said opposed surfaces of said hub members.

13. A steering wheel according to claim 12, wherein said opposed surfaces are provided by grooves formed in said hub members, said grooves being aligned axially of said hub to cooperate to define a channel in which said portion of said spoke core is received, said grooves having surfaces welded to said portion of said spoke core.

14. A steering wheel according to claim 12, wherein said steering shaft has a serrated section and a tapered section and wherein said first through-hole is serrated and adapted to be engaged with said serrated section of said steering shaft and said second through-hole is tapered and adapted to be engaged with said tapered section of said steering shaft.

15. A steering wheel according to claim 1, wherein said positioning means comprise annular engagement protrusions formed on said hub members and disposed around the first and second through-holes, respectively, said annular engagement protrusions having end faces disposed in abutment engagement with each other.

16. A steering wheel according to claim 1, wherein said hub members have opposed end faces in which said grooves are formed, said end faces are disposed in abutment engagement with each other to form a part of said positioning means, and wherein said positioning means further include engagement projection and recess formed on and in said end faces of said hub members and engaged with each other to position said hub member one to the other in the rotational direction of said hub members.

17. A steering wheel according to claim 1, wherein said positioning means comprise engagement projection and recess formed on and in said hub members adjacent to said opposed surfaces and disposed substantially coaxially with said first and second through-holes, respectively, said engagement projection and recess respectively having end face and bottom face disposed in abutment engagement with each other to position said hub members in the axial direction thereof, said engagement projection and recess further having peripheral surfaces disposed in engagement with each other to position said hub members in the rotational direction thereof.

18. A steering wheel according to claim 17, wherein said spoke core is formed of a web of a metal and wherein said engagement projection and recess are both of a polygonal shape, said spoke core being formed therein with a polygonal hole through which said engagement projection extends from one of said hub members through said hole in said spoke core into said engagement recess.

* * * * *